O. R. CHASE.
MACHINES FOR PARING COCOA-NUTS.

No. 194,955. Patented Sept. 11, 1877.

WITNESSES
Harry King
D. P. Cowl

INVENTOR
Oliver Rice Chase,
By Stansbury & Munn,
Attorneys

UNITED STATES PATENT OFFICE.

OLIVER R. CHASE, OF BOSTON, MASSACHUSETTS.

IMPROVEMENT IN MACHINES FOR PARING COCOA-NUTS.

Specification forming part of Letters Patent No. 194,955, dated September 11, 1877; application filed April 5, 1877.

*To all whom it may concern:*

Be it known that I, OLIVER RICE CHASE, of Boston, in the county of Suffolk and State of Massachusetts, have invented certain new and useful Improvements in Machines for Paring Cocoa-Nut; and I do hereby declare that the following is a full, clear, and exact description thereof, which will enable others skilled in the art to which it appertains to make and use the same, reference being had to the accompanying drawings, and to the letters of reference marked thereon, which form a part of this specification.

Figure 1:
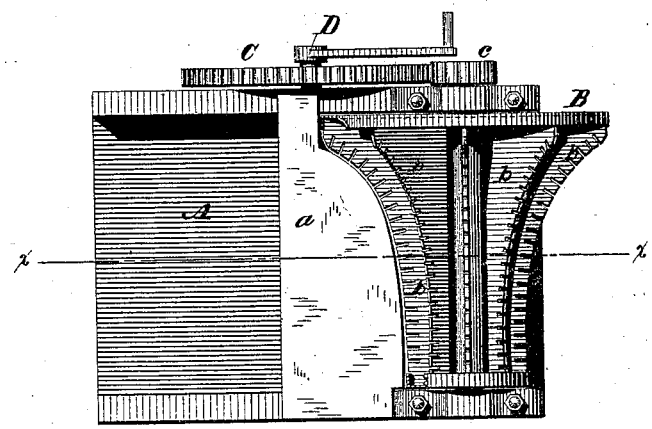
Figure 2:
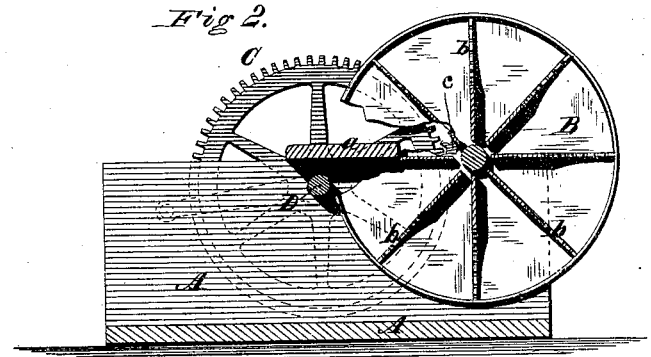

Figure 1 is a top or plan view of my machine. Fig. 2 is a vertical section on line $x\ x$ of Fig. 1.

The same letter indicates the same part in both the figures.

The nature of my invention consists in constructing a paring-machine by arranging in a suitable frame, and in proper relation to a supporting-table, a series of radial curved comb-like blades around a rotating central shaft, an open space being left between the back of each blade and said shaft, and the ends of the blades being attached to circular heads fixed at their centers to the rotating shaft, all as hereinafter more fully set forth.

The removal of the hard outer skin from the cocoa-nut is a process which has heretofore been performed by hand with the common spoke-shave. My paring-machine performs the work much more rapidly and perfectly, and without waste.

In the drawing, A marks the frame of the machine, and $a$ the table on which the nut to be operated upon is held. To shaft D, turned by suitable power, is attached gear-wheel C, which meshes into small pinion $c$, fixed on the end of the main shaft. To one end of this shaft is attached the larger circular head or disk B, and a similar head, of smaller size, is attached to the opposite end of the same. These heads carry the radial blades $b$, which have curved edges, as represented, and are separated at the back by an open space from the central shaft. These blades are square on their outer edges, and are divided, like a comb, into teeth with straight edges, as shown.

The curved form of the blades adapts them to the surface of the cocoa-nut, which is held on the table $a$ and turned in contact with the edges of the revolving blades, which quickly and completely divest it of its outer covering of hard skin.

I claim—

The machine herein described for paring cocoa-nuts, the same consisting of the combination, with a suitable frame and table, of the revolving curved comb-toothed radial cutters, arranged around and at a distance from a central shaft, and supported and driven in the manner specified.

In testimony that I claim the foregoing as my own I hereto affix my signature in presence of two witnesses.

OLIVER R. CHASE.

Witnesses:
 LORENZO BURGE,
 GEO. M. THOMPSON.